United States Patent
Mallesan et al.

(10) Patent No.: US 7,860,990 B2
(45) Date of Patent: *Dec. 28, 2010

(54) SESSION DATA RECORDS AND RELATED ALARMING WITHIN A SESSION OVER INTERNET PROTOCOL (SOIP) NETWORK

(75) Inventors: Saravanan Mallesan, Fairfax, VA (US); Paritosh Tyagi, Germantown, MD (US)

(73) Assignee: Genband US LLC, Plano, TX (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/343,218

(22) Filed: Jan. 31, 2006

(65) Prior Publication Data

US 2007/0180124 A1    Aug. 2, 2007

(51) Int. Cl.
*G06F 15/16* (2006.01)
(52) U.S. Cl. .................. 709/230; 709/238; 709/239
(58) Field of Classification Search .............. 709/230, 709/239
See application file for complete search history.

(56) References Cited

U.S. PATENT DOCUMENTS

| | | | |
|---|---|---|---|
| 5,796,424 A | 8/1998 | Ely et al. | |
| 6,738,813 B1 * | 5/2004 | Reichman | 709/224 |
| 6,775,269 B1 | 8/2004 | Kaczmarczyk et al. | |
| 6,775,280 B1 | 8/2004 | Ma et al. | |
| 6,895,429 B2 | 5/2005 | Banga et al. | |
| 6,904,017 B1 | 6/2005 | Meempat et al. | |
| 6,944,678 B2 | 9/2005 | Lu et al. | |
| 6,980,526 B2 | 12/2005 | Jang et al. | |
| 7,002,973 B2 | 2/2006 | MeLampy et al. | |
| 7,028,092 B2 | 4/2006 | MeLampy et al. | |
| 7,031,311 B2 | 4/2006 | MeLampy et al. | |
| 7,058,974 B1 | 6/2006 | Maher, III et al. | |
| 7,072,303 B2 | 7/2006 | MeLampy et al. | |
| 7,133,923 B2 | 11/2006 | MeLampy et al. | |
| 7,142,532 B2 | 11/2006 | Penfield et al. | |
| 7,151,781 B2 | 12/2006 | MeLampy et al. | |
| 7,193,996 B2 | 3/2007 | Dobbins et al. | |
| 7,260,085 B2 | 8/2007 | Dobbins et al. | |

(Continued)

FOREIGN PATENT DOCUMENTS

EP    1 043 648 A2    10/2000

(Continued)

OTHER PUBLICATIONS

Aleksandra Smiljanić, Flexible Bandwidth Allocation in High-Capacity Packet Switches., IEEE/ACM Transactions on Networking (TON), vol. 10, Issue 2., IEEE Press., Piscataway, NJ, USA., Apr. 2002.*

(Continued)

*Primary Examiner*—Wing F Chan
*Assistant Examiner*—Kostas Katsikis
(74) *Attorney, Agent, or Firm*—Jenkins, Wilson, Taylor & Hunt, P.A.

(57) ABSTRACT

A method and apparatus processes session layer parameters and/or extrinsic parameters with reference to an alarm condition to determine whether a route should be modified. When the alarm condition is either satisfied or unsatisfied, the route can be modified. The session layer parameters and/or extrinsic parameters are contained in a session-data-record.

16 Claims, 5 Drawing Sheets

U.S. PATENT DOCUMENTS

| | | | |
|---|---|---|---|
| 7,362,707 B2 | 4/2008 | MeLampy et al. | |
| 7,376,731 B2 | 5/2008 | Khan et al. | |
| 7,433,315 B2 | 10/2008 | Bhatia et al. | |
| 7,447,160 B1* | 11/2008 | Croak et al. | 370/242 |
| 7,466,710 B1 | 12/2008 | Clemm et al. | |
| 7,483,380 B2 | 1/2009 | Metke | |
| 2001/0033551 A1* | 10/2001 | Busuioc et al. | 370/270 |
| 2002/0024954 A1 | 2/2002 | Cunetto et al. | |
| 2002/0087689 A1 | 7/2002 | Chen | |
| 2002/0087721 A1 | 7/2002 | Sato et al. | |
| 2003/0005152 A1* | 1/2003 | Diwan et al. | 709/239 |
| 2003/0072271 A1 | 4/2003 | Simmons et al. | |
| 2003/0161310 A1 | 8/2003 | Dobbins et al. | |
| 2003/0186702 A1 | 10/2003 | McConnell et al. | |
| 2003/0225893 A1* | 12/2003 | Roese et al. | 709/227 |
| 2004/0015583 A1 | 1/2004 | Barrett et al. | |
| 2004/0025186 A1* | 2/2004 | Jennings et al. | 725/93 |
| 2004/0044871 A1 | 3/2004 | Weber et al. | |
| 2004/0066782 A1 | 4/2004 | Nassar | |
| 2004/0086093 A1 | 5/2004 | Schranz | |
| 2004/0109541 A1 | 6/2004 | Celi et al. | |
| 2004/0117624 A1* | 6/2004 | Brandt et al. | 713/166 |
| 2004/0128201 A1* | 7/2004 | Ofir et al. | 705/17 |
| 2004/0213210 A1 | 10/2004 | Dube et al. | |
| 2004/0218614 A1 | 11/2004 | Yokomitsu et al. | |
| 2005/0111382 A1 | 5/2005 | Le et al. | |
| 2005/0111455 A1 | 5/2005 | Nozue et al. | |
| 2005/0147031 A1* | 7/2005 | Bhatia et al. | 370/229 |
| 2005/0213591 A1 | 9/2005 | Nakazawa et al. | |
| 2005/0265231 A1* | 12/2005 | Gunther et al. | 370/225 |
| 2006/0088025 A1 | 4/2006 | Barkley et al. | |
| 2006/0098577 A1 | 5/2006 | MeLampy et al. | |
| 2006/0126664 A1* | 6/2006 | Horton | 370/471 |
| 2006/0147013 A1 | 7/2006 | Baumeister et al. | |
| 2006/0187927 A1 | 8/2006 | MeLampy et al. | |
| 2006/0187942 A1 | 8/2006 | Mizutani et al. | |
| 2006/0215683 A1* | 9/2006 | Sukkar et al. | 370/437 |
| 2007/0019619 A1 | 1/2007 | Foster et al. | |
| 2007/0036151 A1 | 2/2007 | Baeder | |
| 2007/0058639 A1 | 3/2007 | Khan | |
| 2007/0076591 A1 | 4/2007 | Khan | |
| 2007/0076594 A1 | 4/2007 | Khan et al. | |
| 2007/0076603 A1 | 4/2007 | MeLampy et al. | |
| 2007/0076710 A1 | 4/2007 | Khan | |
| 2007/0076855 A1 | 4/2007 | MeLampy et al. | |
| 2007/0104105 A1 | 5/2007 | MeLampy et al. | |
| 2007/0116043 A1 | 5/2007 | MeLampy et al. | |
| 2007/0180080 A1 | 8/2007 | Mallesan et al. | |
| 2007/0180141 A1 | 8/2007 | Mallesan | |
| 2007/0180142 A1 | 8/2007 | Small et al. | |
| 2007/0201472 A1 | 8/2007 | Bhatia et al. | |
| 2007/0201473 A1 | 8/2007 | Bhatia et al. | |
| 2007/0201481 A1 | 8/2007 | Bhatia et al. | |
| 2007/0201494 A1 | 8/2007 | Lou et al. | |
| 2007/0263660 A1 | 11/2007 | Mitsumori | |
| 2008/0101343 A1 | 5/2008 | Monette et al. | |
| 2008/0159294 A1 | 7/2008 | Irish et al. | |
| 2008/0285569 A1 | 11/2008 | Stademann et al. | |
| 2009/0046720 A1 | 2/2009 | Streijl et al. | |
| 2009/0086728 A1 | 4/2009 | Gulati et al. | |

FOREIGN PATENT DOCUMENTS

| | | | |
|---|---|---|---|
| JP | 2004193845 A * | 7/2004 | |
| WO | WO 02/49279 A2 | 6/2002 | |
| WO | WO 02/49315 A2 | 6/2002 | |
| WO | WO 02/49316 A2 | 6/2002 | |
| WO | WO 02/058349 | 7/2002 | |
| WO | WO 02/060116 A2 | 8/2002 | |

OTHER PUBLICATIONS

Yenra: VOIP: Session Border Controller [online], dated Oct. 18, 2004, [retrieved on Dec. 20, 2004]. Retrieved from the Internet: <URL: http://www.yenra.com/session-border-controlled/> (2 pages).

Stephen Hayes, "IP Based Multimedia Services Platform," Ericsson, ITU-T IMT-2000 and Beyond—May 28, 2002, Ottawa, CN (19 pages).

Acme Packet, Inc., "Session Admission Control: Interactive Communication SLAs over Skinny Pipes" (2002) (14 pages).

Official Action for U.S. Appl. No. 11/343,212 (Mar. 13, 2009).

Official Action for U.S. Appl. No. 11/343,211 (Mar. 4, 2009).

Liu et al., "WSIP—Web Service SIP Endpoint for Converged Multimedia/Multimodal Communication over IP," IEEE International Conference on Web Services (ICWS'04), pp. 1-8 (Jul. 6-9, 2004).

Interview Summary for U.S. Appl. 11/537,329 (Mar. 1, 2010).

Interview Summary for U.S. Appl. No. 11/537,345 (Feb. 5, 2010).

Interview Summary for U.S. Appl. No. 11/343,212 (Jan. 26, 2010).

Final Official Action for U.S. Appl. No. 11/343,211 (Dec. 18, 2009).

Final Official Action for U.S. Appl. No. 11/343,212 (Dec. 18, 2009).

Final Official Action for U.S. Appl. No. 11/864,206 (Dec. 11, 2009).

Official Action for U.S. Appl. No. 11/537,345 (Nov. 3, 2009).

Interview Summary for U.S. Appl. No. 11/343,212 (Oct. 1, 2009).

Official Action for U.S. Appl. No. 11/537,316 (Sep. 25, 2009).

Official Action for U.S. Appl. No. 11/537,329 (Sep. 18, 2009).

Non-Final Official Action for U.S. Appl. No. 11/864,206 (Jul. 23, 2009).

Notification of Transmittal of the International Search Report and the Written Opinion of the International Searching Authority, or the Declaration for International Application No. PCT/US2008/077987 (Jul. 14, 2009).

Official Action for U.S. Appl. No. 11/537,345 (Mar. 4, 2009).

Official Action for U.S. Appl. No. 11/537,329 (Feb. 20, 2009).

Official Action for U.S. Appl. No. 11/537,316 (Feb. 20, 2009).

Tyson et al., "How VoIP Works," Dockitmoto, http://computer.howstuffworks.com/ip-telephony.htm/printable (Downloaded from the Internet on Jan. 19, 2006).

"NexTone Products," http://www.nextone.com/pages/products/product.htm, (Copyright 2005) (Downloaded from the Internet on Jan. 19, 2006).

Interview Summary for U.S. Appl. No. 11/343,212 (Aug. 3, 2010).

Interview Summary for U.S. Appl. No. 11/864,206 (Jul. 6, 2010).

Final Official Action for U.S. Appl. No. 11/864,206 (May 28, 2010).

Official Action for U.S. Appl. No. 11/343,212 (Apr. 28, 2010).

Notice of Allowance for U.S. Appl. No. 11/864,206 (Nov. 12, 2010).

Notice of Allowance and Fee(s) Due for U.S. Appl. No. 11/343,211 (Sep. 7, 2010).

Notice of Allowance and Fee(s) Due for U.S. Appl. No. 11/343,212 (Sep. 7, 2010).

* cited by examiner

SESSION DATA RECORDS AND RELATED ALARMING WITHIN A SESSION OVER INTERNET PROTOCOL (SoIP) NETWORK

RELATED APPLICATIONS

This application is related to the following commonly owned and assigned applications: application Ser. No. 11/343,212, "Adaptive Feedback for Session Over Internet Protocol," filed herewith; and application Ser. No. 11/343,211, "Method and Apparatus for Partitioning Resources within a Session-Over-Internet-Protocol (SoIP) Session Controller," filed herewith; each of which is incorporated herein by reference in its entirety.

FIELD OF INVENTION

The present invention relates to Session over Internet Protocol (SoIP) networks, and in particular, but not by way of limitation, the present invention relates to systems and methods for modifying a route within a SoIP network.

BACKGROUND

Voice telecommunications have traditionally been conducted via dedicated telephone networks utilizing telephone switching offices and either wired or wireless connections for transmitting the voice signal between users' telephones. Such telecommunications that used the public switched telephone network (PSTN), can be referred to as circuit-switched communications. Because of the circuit based nature of the PSTN, modifying a connection by setting up a circuit and implementing a routing change can be a relatively slow process that often requires manual intervention. If considered in the context of the open system interconnection (OSI) model, PSTN modifications generally occur on layers one, two, and three.

Session over Internet Protocol (SoIP), also referred to as Media over Internet Protocol (MoIP), provides an alternative communication means that uses discrete Internet Protocol (IP) packets of digitized information to transmit media content such as voice content, video content and/or data, over the internet or within an intranet via wired and/or wireless connections. SoIP technology includes Voice over Internet Protocol (VoIP) technology, which is used primarily to transmit voice signals over an IP network. Because SoIP technology is based on IP packet switching, SoIP connections and routes can be created and managed quickly using session aware components. Current session aware components, however, do not provide the routing possible with SoIP technology. For example, current session aware components do not dynamically route based on extrinsic parameters or complex alarm conditions. Thus, a need exists for a method and apparatus for modifying SoIP network routes based on extrinsic parameters and complex alarm conditions.

SUMMARY OF THE INVENTION

A method and apparatus processes session layer parameters and/or extrinsic parameters with reference to an alarm condition to determine whether a route should be modified. When the alarm condition is changed from either satisfied to unsatisfied or unsatisfied to satisfied, the route can be modified. The session layer parameters and/or extrinsic parameters are contained in a session-data-record. The apparatus includes a session-data-record receptor manager that receives and stores session-data-record information and an alarm manager that modifies routes based on session-data-record information with reference to the alarm condition.

DETAILED DESCRIPTION

Routes within a Session over Internet Protocol (SoIP) network can be dynamically modified based on session-layer information collected within the SoIP network. SoIP technology, also referred to as Media over Internet Protocol (MoIP), can be used to transmit many forms of communication such as voice (via Voice over Internet Protocol (VoIP)), video, video conferencing, digital data transfer, etc. For example, a session controller (SC) can dynamically modify routes based on session data that can be stored in session-data-records (SDRs) that are associated with connections established within a SoIP network and provided to an SC-network controller. The route modification can be, for example, a change in a priority or a connection limit associated with a route.

An SC can be part of a route between a source endpoint and a destination endpoint within a SoIP network, and can collect the session data about the respective SoIP connection. This session data can be stored within an SDR that is provided to the SC-network controller. The SDR can include values for one or more session layer parameters and/or extrinsic parameters. Upon receiving the SDR and other SDRs, the SC-network controller can trigger a feedback signal to the SC in response to an alarm condition that changes from satisfied to unsatisfied or vice versa. The alarm conditions are defined such that routes are modified to meet the needs of customers using the routes and/or providers who are using the SoIP network. The alarm conditions can be based on any combination of the extrinsic parameters and session layer parameters using boolean logic or mathematics. Multiple alarm conditions can be tested simultaneously using alarm threads executing in parallel in an alarm pool.

Figure 1:
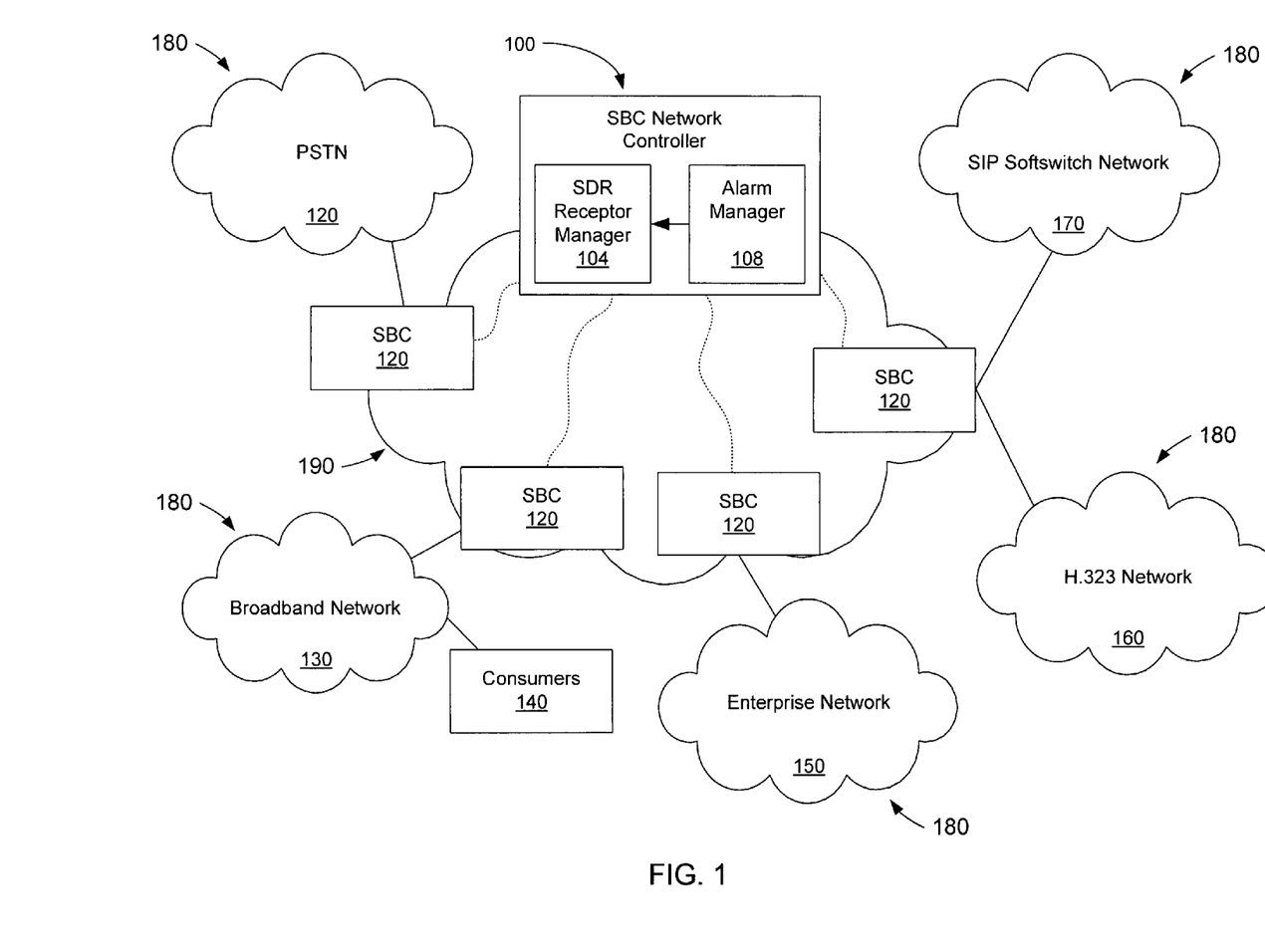
FIG. 1 shows a system block diagram of a Session over Internet Protocol (SoIP) network, according to an embodiment of the invention.

Referring now to the drawings, FIG. 1 is a block diagram of a SoIP network 190, according to an embodiment of the invention. The figure shows a session-border-controller network controller (SBC-network controller) 100 connected to multiple session border controllers (SBCs) 120. The SBCs 120 each establish, control, and monitor connections between one or more endpoints 180. The SBC-network controller 100 is a centralized management component that controls, configures, and coordinates the SoIP network 190. The SBC-network controller 100 can include a user interface (not shown) for configuring one or more SBCs 120 that are connected to the SBC-network controller 100. Because not all SCs in SoIP network 190 may be at the borders of the network, SBC-network controller 100 may, in such contexts, be termed an SC-network controller.

The SBCs 120 establish and control connections between the endpoints 180 based on routing information that includes, for example, routing logic, endpoint information, connection-limits, and route priority information. A route can be modified by, but is not limited to, changes in the routing information. The routing information can be individually associated with a given virtual routing partition established on the SBC 120 or can be a commonly owned set of routing information that is managed on more than one SBC 120. More details regarding virtual partitions within an SBC are set forth in co-pending application Ser. No. 11/343,211, "Method and Apparatus for Partitioning Resources within a Session-Over-Internet-Protocol (SoIP) Session Controller," which is incorporated herein by reference.

Upon termination of a connection between endpoints 180, the SBCs 120 generate an SDR, also referred to as a session-detail-record, which contains session data about the connection. The session data includes, but is not limited to, session layer parameters and extrinsic parameters. The session layer parameters include, for example, a call duration indicator, start and end time indicators, and source and destination endpoint indicators as well as quality-of-service (QoS) information such as a delay indicator, a media quality indicator, a packet loss indicator, a packet delay variance (jitter) indicator, and an r-factor. Extrinsic parameters include, for example, variables such as a time-of-day indicator, a day-of-the-week indicator, a number-of-calls indicator, or route cost parameters.

The SBC-network controller 100, which includes an SDR-receptor manager 104 and an alarm manager 108, processes session data with reference to an alarm condition to determine whether a route should be modified based on the alarm condition being either satisfied or unsatisfied. The alarm condition is based on, but is not limited to, the session data in the multiple SDRs, each of which includes the session layer parameters and the extrinsic parameters. The SDR-receptor manager 104 receives and stores the session data contained in the SDRs transmitted from the SBCs 120. The alarm manager 108 executes alarm threads that process session data relevant to alarm conditions.

The alarm manager 108 also determines, based on the processed session data and with reference to the alarm conditions, whether or not to generate a feedback signal that will result in the modification of a route. When the alarm condition changes from either satisfied to unsatisfied or vice versa, the alarm manager 108 sends one or more indicators that trigger the modification of one or more routes established, controlled, or monitored by the SBCs 120. The indicator can be a signal that triggers a routing change or a signal that contains a set of instructions with detailed information for modifying the routing information on at least one SBC 120. The indicator can also directly modify routing information, for example, by rewriting a file (e.g. a text file) stored on an SBC 120 and/or the SBC-network controller 100. In general, the functionality of the components within the SBC-network controller 100 can be implemented in software, firmware, custom hardware, or any combination thereof.

In this illustrative embodiment, the endpoints 180 include but are not limited to a public switched telephone network (PSTN) 120, broadband network 130 that can provide network access to consumers 140, enterprise network 150, H.323 network 160, session initiation protocol (SIP) softswitch network 170, or a SIP network (not shown). An endpoint 180 could also be an individual phone/computer terminal (not shown) or an access point to another SoIP network (not shown). Each of the endpoints 180 is an endpoint from the perspective of the individual SBC 120 that is connected to the endpoint 180.

The SDRs are typically received by the SBC-network controller 100 when the connection is terminated. In some embodiments, however, they can also be received by the SBC-network controller 100 in a batch mode at specified time intervals or upon request by the SBC-network controller 100. In some embodiments, SDRs or portions of SDRs can be received by the SBC-network controller before a connection has terminated as the portions become available.

Although the SBC-network controller 100 is centralized in the illustrative embodiment of FIG. 1, its functionality can, in other embodiments, be distributed throughout SoIP network 190 on any number of SCs that are on the borders or reside in the interior of the SoIP network 190. Also, the SBCs 120 can be configured to operate with a range of autonomy from an entirely autonomous mode independent from the SBC-network controller 100 to an entirely dependent mode where the SBCs 120 are controlled by the SBC-network controller 100.

Figure 2:
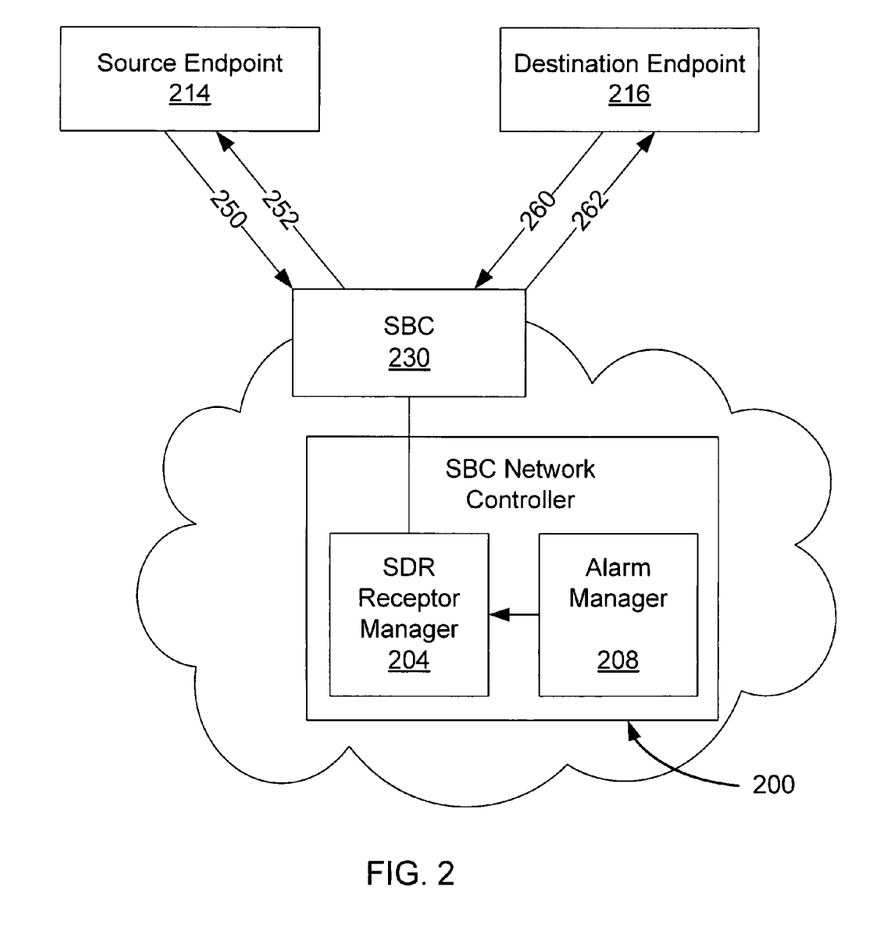
FIG. 2 shows a block diagram of a connection configuration that implements mid-network collection of session layer parameters, according to an embodiment of the invention.

The QoS information included in an SDR for a connection established by an SBC 120 between endpoints 180 can be, for example, end-to-end QoS information or QoS information that is collected mid-network at an SBC 120. FIG. 2 shows a block diagram of a typical end-to-end connection configuration that employs a mid-network collection technique to determine the QoS for the overall connection. In the mid-network collection technique, the QoS information for a portion of a connection, and in particular the packets transmitted into the SBC 230, are used to quantify the QoS for the entire connection.

FIG. 2 shows the connections 250, 252, 260, and 262 included in the SoIP connection between a source endpoint 214 and a destination endpoint 216 routed through an SBC 230. When a packet of data is transmitted end-to-end from the source endpoint 214 to the destination endpoint 216, the packet transmitted via connection 250 from the source endpoint 214 to the SBC 230 and then forwarded by the SBC 230 via connection 262 from the SBC 230 to the destination endpoint 216. Likewise, for an end-to-end transmission of a packet from the destination endpoint 216 to the source endpoint 214, the packet is transmitted via connection 260 from the destination endpoint 216 to the SBC 230 and then forwarded by the SBC 230 in a transmission via connection 252 from the SBC 230 to the source endpoint 214.

Because SBC is session aware, SBC 230 has direct access to QoS parameter values contained in packets via connections 250 and 260 received by the SBC 230 or can calculate QoS parameter values for packets via connections 250 and 260 received by the SBC 230. The QoS parameter values from packets transmitted via connections 250 and 260, although only portions of the end-to-end connection, can be associated with an SDR in the form of a QoS for the end-to-end connection. The QoS can be determined using any mathematical combination of packets transmitted on connections 250 and 260. For example, a QoS delay associated with an end-to-end connection can be the sum of the average delay of a representative group of packets from connection 250 and the average delay of a representative group of packets from connection 260 for the end-to-end connection.

Figure 3:
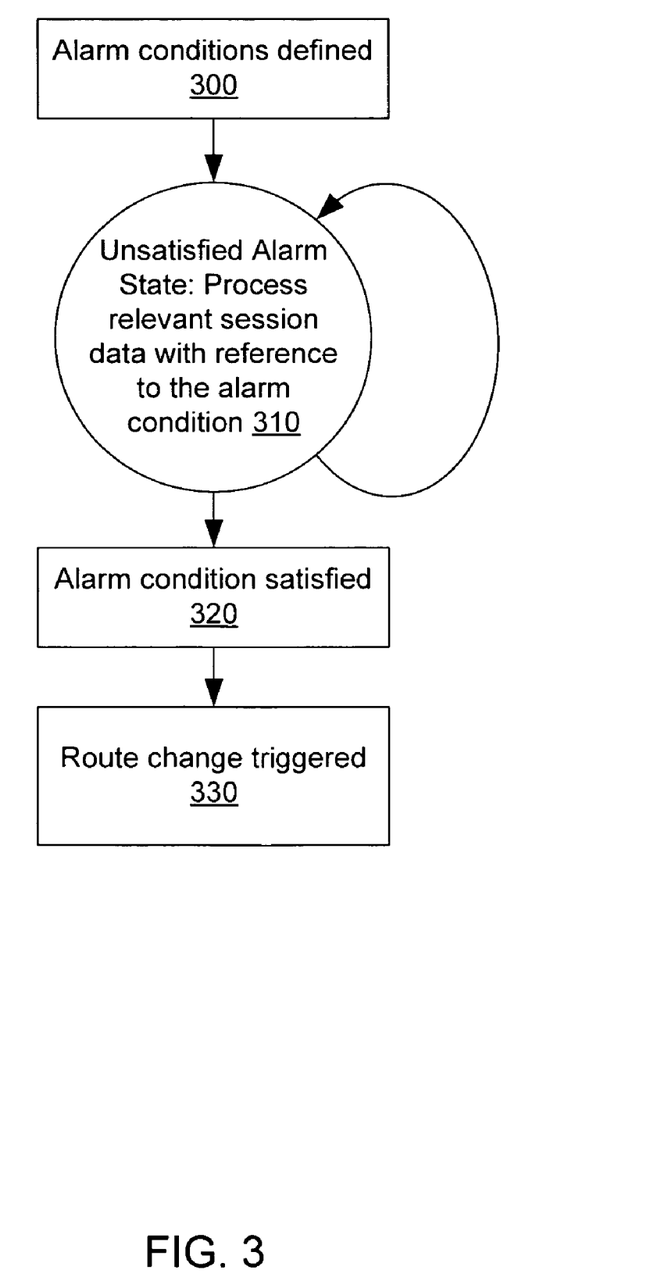
FIG. 3 is a flowchart that illustrates an alarm flow, according to an embodiment of the invention.

FIG. 3 is a flowchart that illustrates an alarm flow that can be used to trigger a routing change for a route in a SoIP network. The flowchart shows that one or more alarm conditions are first defined at 300. The alarm conditions can include any condition relating to the SoIP network. The state of an alarm condition is generally based on, but not necessarily limited to, session layer parameters and extrinsic parameters that are included in an SDR.

The alarm condition can be a single threshold limit associated with a session layer parameter such as a QoS parameter or can be a complex condition that incorporates more than one session layer parameter in any mathematical or logical combination with any type or number of threshold values or limits. For example, the alarm condition can be an alarm condition that incorporates a boolean condition that is only satisfied when a jitter parameter exceeds a specified threshold value and when a delay parameter exceeds a different specified threshold value.

In some embodiments, rather than being a boolean type alarm condition, the alarm condition can be defined such that the alarm condition is satisfied when the multiplication or addition of two QoS parameters is less than a certain value or even between specified limits. In some embodiments, the alarm condition can be based on the most recently received SDRs. Alternatively, the alarm condition can be defined such that the alarm condition is only satisfied when a certain volume of data, when averaged over time, exceeds a threshold value. This type of averaging of historical data as a moving average can also be termed a moving-window average.

The alarm conditions can also be defined in terms of extrinsic parameters such as time-of-day, day of the week, numbers of calls, or route cost parameters. A extrinsic-parameter values can be included in or associated with one or more SDRs. For example, an alarm condition can be configured such that a route is modified at a certain time of day and day of the week or modified based on a certain number of calls that are connected using the route. The extrinsic parameters can also be used, for example, in any alarm condition in combination with a QoS-based condition. For example, an alarm condition can be defined such that a QoS-based condition associated with a particular alarm condition is not considered for an SBC if the total number of SDRs or total number of connections processed by the SBC are above or below a threshold limit during a specified period of time. This kind of conditional limit within an alarm condition can be referred to as a system load filter.

Route cost parameters such as the cost of a connection can also be included in an SDR to allow for alarming and route modification based on cost. This information can be used in conjunction with an alarm condition that is configured to identify, for example, a least cost route or a maximum-profit route. If an alarm condition is defined so that the priority of several routes on one or more SCs are modified to maximize profits, the average cost of connections on various routes can be calculated with reference to the profit-maximizing alarm condition and routing adjustments can be made to maximize profits. Alternatively, if an alarm condition is defined so that the priority of several routes on one or more SCs are modified to minimize costs, the average cost of connections on various routes can be calculated with reference to the low-cost alarm condition and routing adjustments can be made to minimize costs. The route cost parameters can be included as relative values that are not tied to a specific currency.

In some alternative embodiments, the alarm conditions can be based on data that can be collected from partially loaded SDRs before a call has been terminated. For example, an alarm condition can trigger the termination of a connection through the adjustment of a route if a connection exceeds a specified time limit.

After the alarm conditions have been defined at 300, session data relevant to the alarm conditions is processed at 310. Information such as a specific value of a QoS parameter, if relevant to the alarm condition, can be extracted from at least one SDR generated by one or more SCs. Likewise, a value of an extrinsic parameter such as the time-of-day, if relevant to the alarm condition can be obtained. If the alarm condition is related to a combination of parameters in the SDR such as the extrinsic parameters and session layer parameters, values of the relevant parameters can be retrieved and processed to determine the state of the alarm condition.

The flowchart shows that the relevant data is repeatedly processed with reference to the alarm condition at 310, as indicated by the looping arrow, until the alarm condition is satisfied at 320. When the alarm condition is satisfied, the alarm-state changes from an unsatisfied alarm-state to a satisfied alarm-state. The frequency with which the data is processed and compared with the alarm condition in the unsatisfied alarm-state can be varied depending upon variables such as the volume of data being processed, the frequency in which data is received or updated, and the types of alarm conditions that are being monitored.

The alarm condition and the instructions for extracting relevant session data can be contained in an alarm thread that is executed by, for example, an alarm manager (e.g. alarm manager 208 in FIG. 2) that has access to the values for the appropriate SDR session data. The alarm thread can be programmed to run only when new data is obtained by the alarm manager or can be programmed to run at regular intervals. Alternatively, the alarm thread can be programmed to run only when a the alarm manager has the capacity to handle the execution of the thread.

An alarm thread, which can also be an alarm function, can be programmed to accommodate complex alarm conditions and can be programmed to filter and process data for those alarm conditions. For example, if the alarm condition is based on an average of a specified quantity of data or a specified interval of data, the alarm thread can process historical data to create moving averages or a moving-window average. The alarm thread can be programmed to remove statistically invalid points when processing the data and calculating averages that are compared with alarm conditions.

An alarm thread can be executed in parallel with multiple other alarm threads each of which contain alarm conditions that are separately monitored based on session layer parameters and extrinsic data. Because the alarm threads can contain alarm conditions and/or instructions for route changes that overlap, conflicts between alarm threads can be resolved by assigning priorities to the alarm conditions, alarm threads, and/or route changes. The alarm threads and their associated conditions can also be analyzed and combined based on their overlap. For example, a new alarm thread can be instantiated if alarm conditions within two or more alarm threads overlap in a manner such that a single alarm thread could equivalently cover the two or more alarm threads.

When the alarm condition is satisfied and the alarm-state changes from unsatisfied to satisfied a route change is triggered at 330. The route change can be triggered by an indicator that, for example, directly modifies a route or triggers the sending of detailed instructions that are received by an SC. The indicator itself can also contain detailed instructions that can be processed by an SC to modify routing information. The type of indicator and information contained in the indicator can be specified in an alarm condition or generated by an alarm thread programmed to specify the information contained in the indicator.

Although the flowchart shows that the alarm conditions are defined 300 before relevant data is processed and compared with the alarm condition 310, the definition of an alarm condition and even the configuration of an alarm thread that executes the processing of data with reference to an alarm condition can be modified at any point in the flow. For example, if a first alarm condition in a first alarm thread is in conflict with a newly defined second alarm condition in a second alarm thread, the first alarm thread that may already be processing data can be modified based on the conflicting second alarm condition.

Figure 4:
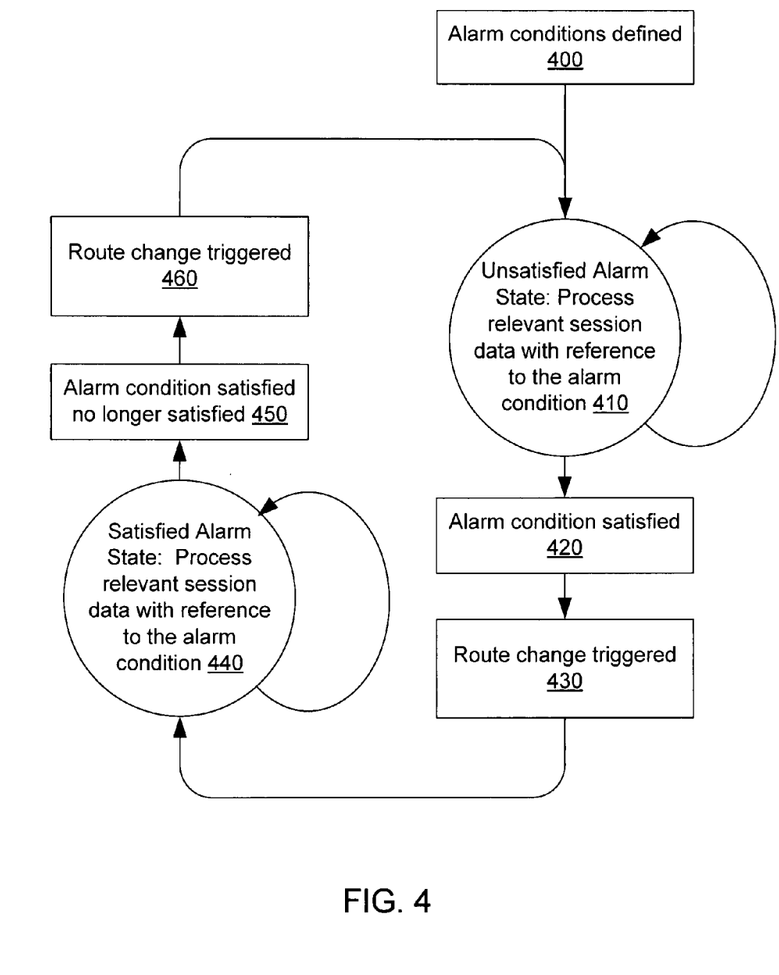
FIG. 4 is a flowchart that illustrates a full-cycle alarm flow, according to an embodiment of the invention.

FIG. 4 is a flowchart that, like FIG. 3, shows an alarm flow that can be used to trigger a routing change for a route in a SoIP network. However, FIG. 4 shows a full-cycle alarm loop. The alarm flow is a full-cycle alarm loop because the alarm-state changes from an unsatisfied alarm-state at 410 to a satisfied alarm-state at 440 at some point in time, and then back to an unsatisfied alarm-state at 410 at some later point in time. These changes are triggered when an alarm condition is first unsatisfied, then satisfied and once again unsatisfied. The figure shows that while in an unsatisfied alarm-state, data that is relevant to the alarm condition is processed with reference to the alarm condition at 410. The relevant data is repeatedly processed with reference to the alarm condition at 410, as indicated by the looping arrow, until the alarm condition is satisfied at 420. When the alarm condition is satisfied at 420, a route change is triggered at 430 and the alarm-state becomes satisfied at 440. In the satisfied alarm-state, data relevant to the alarm condition is processed with reference to the alarm condition at 440. The relevant data is repeatedly processed with reference to the alarm condition at 440, as indicated by the looping arrow, until the alarm condition is no longer satisfied at 450. When it is determined that the alarm condition is no longer satisfied at 450, a route change is triggered at 460 and the alarm-state becomes unsatisfied at 440.

Although the flowchart shows that the alarm conditions are defined at 400 before relevant data is processed with reference to the alarm condition at 410, the definition of an alarm condition and even the configuration of an alarm thread that executes the processing of data with reference to an alarm condition can be modified at any point in the flow. For example, the alarm condition can be defined initially in a satisfied alarm-state rather than in an unsatisfied alarm-state.

Figure 5:
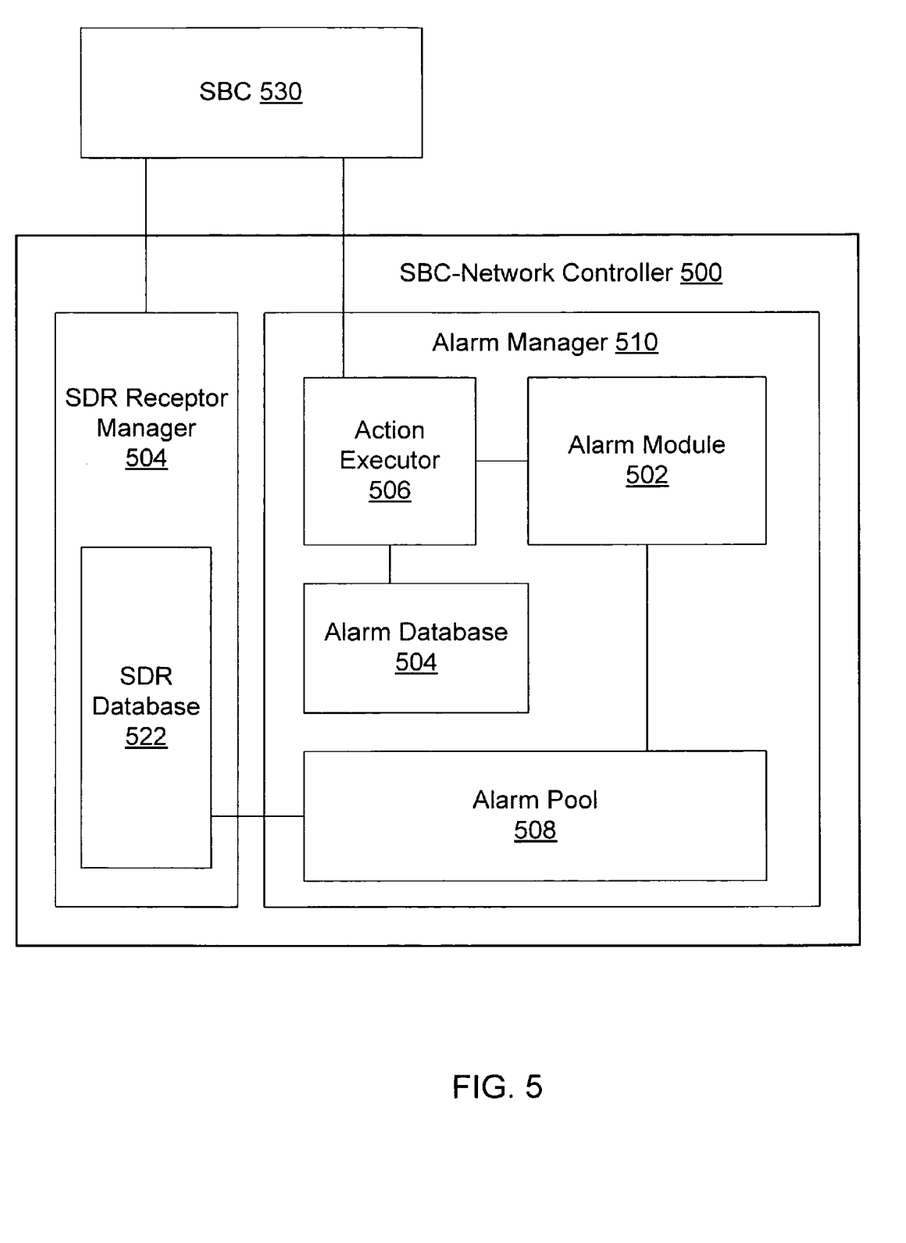
FIG. 5 shows a system block diagram of an apparatus that modifies a route based on a session-data-record, according to an embodiment of the invention.

FIG. 5 shows a system block diagram of an SBC-network controller 500 configured to modify a route administered by a SBC 530 based on alarm conditions defined in an alarm thread. The SBC-network controller 500 can use the alarm flows shown in FIGS. 3 and 4 to trigger a modification of a route that is administered by the SBC 530. The SBC-network controller 500 includes an SDR-receptor manager 504 and an alarm manager 510.

The SDR-receptor manager 504 receives SDRs from the SBC 530 upon termination of a connection that included the SBC 530. The SDR-receptor manager 504 stores the SDRs in an SDR database 522. The SDR database not only stores the typical session data, but also stores the session layer parameters associated with the SDRs and extrinsic parameters such as least-cost route data and maximum-profit route data that is associated with a route. The extrinsic parameters can be included in the SDR and extracted or calculated by the SDR-receptor manager 504 or extracted or calculated using a separate module not shown in this figure. The SDRs with their associated session layer parameters and extrinsic parameters can be accessed by the alarm manager 510.

The alarm manager 510 includes an alarm pool 508 which represents a pool of alarm threads that can be executed in parallel or serially. The alarm module 502 within the alarm manager 510 instantiates and executes the alarm threads and resolves conflicts between the alarm threads within the alarm pool 508 such as alarm condition conflicts. For example, the alarm module 502 can define a new alarm thread if alarm conditions within two or more alarm threads overlap in a manner such that a single alarm thread could equivalently cover the two or more alarm threads.

The alarm module 502 can also be programmed, for example, to execute all of the configured alarm threads, throttle the alarm threads, or execute selected alarm threads. The execution of selected alarm threads can be based on a variety of variables such as the capacity of the alarm manager 508, the volume of data in the SDR database 522, or a user input. The alarm threads in the alarm pool 508 collect the data relevant to the alarm condition from the SDR database 522 and processes the data with reference to the alarm condition defined in the alarm thread.

When an alarm condition is changed from satisfied to unsatisfied or vice versa, the alarm module 502 receives an action indicator from the alarm thread. The action indicator can have a value referred to herein an action identifier (action ID) that is forwarded by the alarm module 502 to the action executor 506. The action executor 506 interrogates a look-up table in an alarm database 504 and/or SDR database 522 to determine what and how an action should be executed based on the action ID. For example, for a particular action ID, the action executor 506 can determine based on information in the alarm database 504 and based on session data in the SDR database 522 that an instruction should be sent to SBC 530 to modify a route. Based on another action ID, the action executor 506 can directly modify routing information on an SC. An action ID contained in the action indicator can prompt the action executor 506 to send a notification e-mail indicating that a route has been modified.

In some embodiments, each of the functions performed by the separate components in the alarm manager 508, SDR-receptor manager 504, and SDR database 522 can be moved and combined into other managers, components and/or modules or combined into one or more modules or SBC-network controllers that are not show in this figure. Also, in some embodiments, the alarm thread can be programmed so that the alarm indicator can be a signal that prompts the alarm module 502 to take an action or can contain more specific information such as the values that caused the alarm condition to be either satisfied or unsatisfied.

Although the SDR database 522 is shown here as being a part of the SDR-receptor manager 504, the SDR database 522 can be a separate and/or distributed database that is not integrated as part of the SBC-network controller 500. Likewise, the alarm database 504 can be a separate and/or distributed database that is not part of the alarm manager 508. Also, the SBC-network controller 500 can be configured to communicate with other SCs such as other SBC-network controllers and other SBCs.

In conclusion, among other things, a method and apparatus for modifying a route based on session layer parameters and extrinsic parameter is described. While various embodiments of the invention have been described above, it should be understood that they have been presented by way of example only, and various changes in form and details may be made. For example, two separate alarm managers can use a single alarm pool to monitor SCs operating in separate portions of a SoIP network.

What is claimed is:

1. An apparatus, comprising:
   a session border controller (SBC) network controller configurable to operate within a Session over Internet Protocol (SoIP) network comprising:
   a session detail record (SDR) receptor manager that receives, from a plurality of SBCs, SDRs generated by the SBCs and that stores the SDRs, the SDRs each including session data of a media session comprising session layer parameters and extrinsic parameters,
wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, and a ratings factor (r-factor),
wherein the extrinsic parameters include at least one of a time-of-day indicator, a day-of-week indicator, a number-of-calls indicator, and a route cost indicator parameter; and
an alarm manager that processes the session data in the SDRs received from the SBCs with respect to an alarm condition and dynamically modifies one of a connection limit and a priority associated with a route through one or more of the SBCs when the processing indicates that an alarm-state changes.

2. The apparatus of claim 1, wherein the alarm manager detects the alarm-state change based on an alarm condition within an alarm thread.

3. The apparatus of claim 1, wherein the alarm manager sends an action indicator based on the alarm-state change, the action indicator triggering an action.

4. The method of claim 1, wherein the modifying includes modifying when an alarm condition is at least one of satisfied or not satisfied with reference to the route cost indicator parameter, the alarm condition being based on the route cost indicator parameter.

5. The method of claim 1, wherein the one of a connection limit and a priority includes a connection-limit associated with an endpoint, the endpoint being associated with the route, the modifying includes at least one of increasing the connection-limit or decreasing the connection-limit.

6. The method of claim 1, wherein the one of a connection limit and a priority includes a priority associated with at least one of the route and an endpoint, the at least one of the route and the endpoint being associated with the SoIP network, the modifying includes modifying the priority.

7. The method of claim 1, wherein the modifying includes modifying when an alarm condition is at least one of satisfied or not satisfied with reference to the route cost indicator parameter, the alarm condition being based on the route cost indicator parameter;
the method further comprising:
sending, at the alarm manager of the session controller, an action indicator based on the alarm condition being at least one of satisfied or not satisfied, the action indicator triggering an action.

8. The method of claim 1, wherein the modifying includes modifying when an alarm condition is at least one of satisfied or not satisfied with reference to the route cost indicator parameter, the alarm condition being based on the route cost indicator parameter, the alarm condition is included in a first alarm thread from a plurality of alarm threads, the plurality of alarm threads being executed in parallel.

9. A method, comprising:
receiving, at a session detail record (SDR) receptor manager of a session border controller (SBC) network controller within a Session over Internet Protocol (SoIP) network, session data of a media session comprising session layer parameters and extrinsic parameters,
wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, and a ratings factor (r-factor),
wherein the extrinsic parameters include at least one of a time-of-day indicator, a day-of-week indicator, a number-of-calls indicator, and a route cost indicator parameter; and
modifying, at an alarm manager of the SBC network controller, one of a connection limit and a priority associated with the route when an alarm-state of an alarm condition is changed from at least one of satisfied to unsatisfied and unsatisfied to satisfied, the alarm condition being based on a combination of the session layer parameter and the extrinsic parameter.

10. The method of claim 9, wherein the session layer parameter and the extrinsic parameter are associated with at least one session controller, the one of a connection limit and a priority being associated with the at least one session controller.

11. The method of claim 9, wherein the one of a connection limit and a priority includes a connection-limit associated with an endpoint, the endpoint being within the SoIP network, the modifying includes at least one of increasing the connection-limit or decreasing the connection-limit.

12. The method of claim 9, wherein the one of a connection limit and a priority includes a priority associated with at least one of the route and an endpoint, the at least one of the route and the endpoint being associated with the SoIP network, the modifying including modifying the priority.

13. The method of claim 9, wherein the alarm condition is included in a first alarm thread from a plurality of alarm threads, the plurality of alarm threads being executed in parallel.

14. The method of claim 9, wherein the session layer parameter includes at least one of a low media quality, a high packet loss, and a packet delay variance.

15. The method of claim 9, wherein the extrinsic parameter includes at least one of a time-of-day, a day-of-a-week, a system load filter, and a route cost indicator parameter.

16. A method, comprising:
measuring, at a session border controller (SBC), a quality-of-service (QoS) value for a Session over Internet Protocol (SoIP) connection between a source endpoint, the SBC, and a destination endpoint, the measuring being based on information for a portion of the SoIP connection, the portion of the SoIP connection being a transmission from at least one of the source endpoint and the destination endpoint to the SBC;
the QoS value included in a session detail record (SDR) associated with the SoIP connection, the SDR including session data of a media session comprising session layer parameters and extrinsic parameters,
wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, and a ratings factor (r-factor),
wherein the extrinsic parameters include at least one of a time-of-day indicator, a day-of-week indicator, a number-of-calls indicator, and a route cost indicator parameter; and
modifying a route when an alarm-state of an alarm condition is changed from at least one of satisfied to unsatisfied and unsatisfied to satisfied, the alarm condition being referenced to the QoS value, the QoS value determined from the SDR; and an alarm manager processes the session data in the SDR received from the SBC with respect to the alarm condition and dynamically modifies one of a connection limit and a priority associated with a route through the SBC when the processing indicates that an alarm-state changes.

* * * * *